No. 812,373. PATENTED FEB. 13, 1906.
L. L. SIDWELL.
PNEUMATIC TIRE PROTECTOR.
APPLICATION FILED SEPT. 23, 1904.
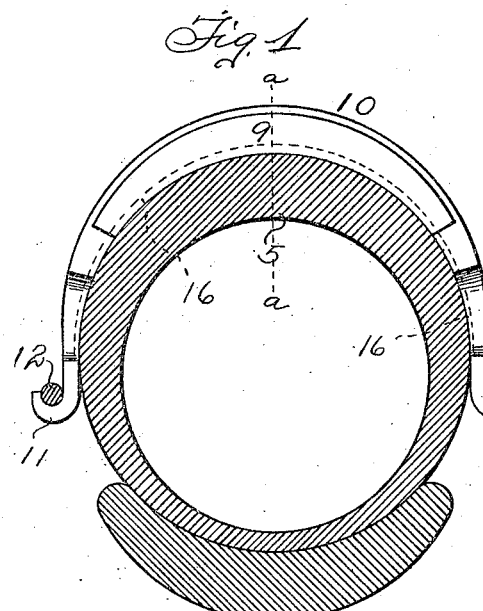
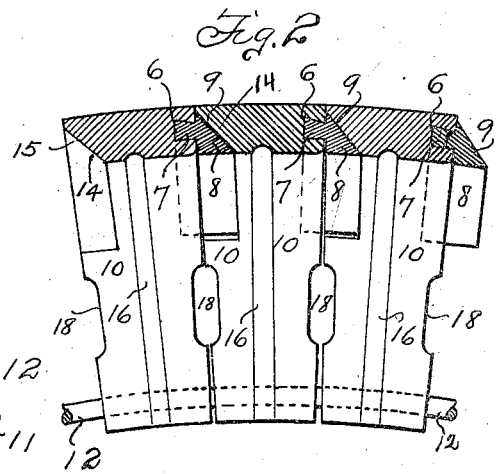
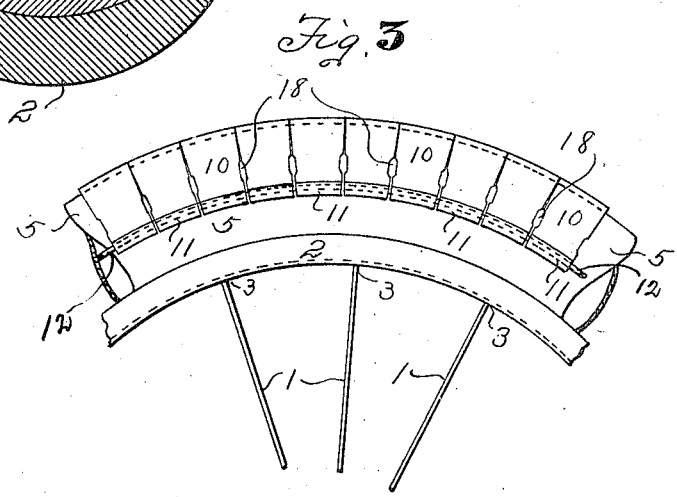
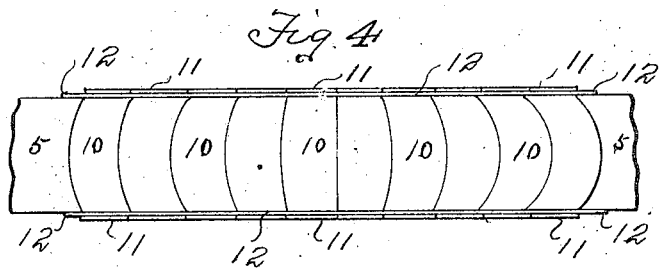
WITNESSES:
Owen G. Cates
G. H. Woodcock
INVENTOR
Lester L. Sidwell
BY James W. Rogers
ATTORNEY

UNITED STATES PATENT OFFICE.

LESTER L. SIDWELL, OF RIVERA, CALIFORNIA.

PNEUMATIC-TIRE PROTECTOR.

No. 812,373.

Specification of Letters Patent.

Patented Feb. 13, 1906.

Application filed September 23, 1904. Serial No. 225,661.

*To all whom it may concern:*

Be it known that I, LESTER L. SIDWELL, a citizen of the United States, residing at Rivera, county of Los Angeles, State of California, have invented and discovered a new and useful Improvement in Pneumatic-Tire Protectors; and I do hereby declare the following to be a full, clear, and exact description of the invention, such as will enable others skilled in the art to which it appertains to make and use the same.

This invention relates to improvements in tire-protectors for automobiles, bicycles, and other vehicles; and the objects of my improvement are, first, to provide means for protecting tires of vehicles from puncture and corrosion while being used, reference being made to the accompanying drawings, and to reference-numerals marked thereon.

The invention consists, essentially, of the construction, combination, and arrangement of the several parts, as will be hereinafter fully described in the specification, shown upon the drawings appended hereto, and specifically pointed out in the claims made a part hereof.

I attain these objects by the construction, combination, and arrangement of the several parts illustrated upon the accompanying drawings, in which—

Figure 1 is a cross-sectional view of the felly and tire removed from the wheel of the vehicle, one of a series of semicircular protecting-pieces upon the tire shown in elevation and the wires for securing the said pieces in place upon the tire. Fig. 2 is a cross-sectional view on the line *a a* of Fig. 1, the tire removed, showing three of the protecting-pieces, the buffers between said pieces partly in section and partly in elevation, and one of the wires used for retaining the said protecting-pieces upon the tire. Fig. 3 is a view in elevation of a series of semicircular protecting-pieces secured by a wire upon a section of the tire, a portion of the felly, and portions of the spokes of the wheel secured to the felly, parts of the said wire, felly, and spokes broken away; and Fig. 4 is a plan view of a series of semicircular protecting-pieces secured upon a section of the tire, the ends of the tire broken away.

Similar reference-numerals refer to like parts throughout the several views.

The reference-numerals 1 1 denote the spokes of a wheel of an automobile, bicycle, or other vehicle.

The numeral 2 designates the felly of the wheel, to which the ends 3 3 of the spokes 1 1 are secured, the hub of the wheel and other parts thereof not necessary to be shown.

The numeral 5 indicates the pneumatic tire, secured upon the felly 2 of the wheel of a vehicle in the usual well-known manner.

The tire-protecting pieces 10 10 I preferably construct semicircular in form, as illustrated upon Figs. 1 and 3 of the drawings. I may, however, make them in any suitable form. The said protecting-pieces 10 are provided at each end thereof with curved portions or hooks 11 11, in which the wires 12 12 are movably seated whenever the tire is compressed, the said wire extending around the tire on opposite sides thereof at terminii on a horizontal line cutting the tire about midway between the point of contact of the tire with a surface on which it moves and the point of contact with the felly of the wheel. The curved protecting-pieces 10 10 are provided with dovetailed recesses 6 6 in the adjoining edges thereof, in which recesses the tongues 7 7 of the buffers 8 8 are adapted to be secured. The buffers 8 8 are provided with beveled faces 9 9, which contact with the inclined surfaces 14 14 of the recesses 15 15 in the adjacent edges of the adjoining curved protecting-pieces 10 10 of the tire. The curved protecting-pieces 10 10 are provided with longitudinal grooves 16 16 upon the inner faces thereof in order to permit sand, grit, and like material to escape that may by chance work in between the inner surface of each of the said protecting-pieces 10 10 and the exterior surface of the tire. Each of the abutting protecting-pieces 10 10 is provided with corresponding registering cut-out portions 18 18, which also permits the escape of sand and dirt from between the adjoining surfaces of the abutting protecting-pieces 10.

It will readily appear from the foregoing description, when read in connection with the drawings hereto appended and made a part of the specification and claims, what is the operation of applicant's tire-protector, and further description of the manner of operating the same is deemed unnecessary.

It is obvious that many variations and changes in the details of construction, combination, and arrangement of the parts of my invention will readily suggest themselves to persons skilled in the art and still be within the spirit and scope of my improvement.

I do not desire to confine this invention to the specific construction and arrangements of parts herein shown and described, and the right is reserved to make all changes in and modifications of the same that come within the spirit of this invention; but I do desire to secure as my invention all features of construction and equivalents thereof that come within the scope of my improvement as herein shown and described, and illustrated upon the drawings appended hereto.

Having described my invention, what I do claim, and desire to secure by Letters Patent, is—

1. A tire-protector comprising a series of curved protecting-pieces, buffers secured between said pieces and means for securing the said curved protecting-pieces upon the tire, said means adapted to slide upon the said curved pieces.

2. A tire-protector comprising a series of curved protecting-pieces provided with dovetailed recesses therein, buffers having dovetailed tongues adapted to be secured in said recesses and means for retaining said protecting-pieces upon the tire.

3. A tire-protector comprising curved protecting-pieces having cut-away portions in the adjoining edges thereof and dovetailed recesses in said pieces, buffers provided with tongues and beveled portions adapted to be secured between the adjacent edges of said protecting-pieces and means for retaining said protecting-pieces upon the tires.

4. A tire-protector comprising a series of curved protecting-pieces having hooks upon the ends thereof, buffers secured between said pieces, wires adapted to be seated upon the hooks and adapted to automatically slide thereon when the tire is contracted and expanded.

5. A tire-protector comprising curved protecting-pieces having hooks upon the extremities thereof and provided with grooves upon the inner faces of said pieces, buffers adapted to be secured between the adjoining edges of said protecting-pieces and means for retaining said pieces upon the tire.

6. A tire-protector comprising a series of curved protecting-pieces having hooks upon the ends thereof and provided with grooves upon the inner faces of said pieces, buffers secured between the adjacent edges of said pieces and means for securing the said pieces upon the tire.

In testimony whereof I have signed my name to this specification in the presence of two subscribing witnesses.

LESTER L. SIDWELL.

Witnesses:
ANNA MORGAN,
G. H. WOODCOCK.